Aug. 9, 1938.  S. R. OGILBY  2,126,273
METHOD OF MAKING SPONGE RUBBER
Filed Aug. 13, 1936

LATEX STABILIZED AGAINST COAGULATION BY CARBON DIOXIDE
↓ CHARGE WITH CARBON DIOXIDE UNDER PRESSURE

UNCOAGULATED LATEX UNDER PRESSURE CONTAINING DISSOLVED CARBON DIOXIDE
↓ RELEASE PRESSURE AND POUR INTO MOLDS

SHAPED UNCOAGULATED LATEX FOAM
↓ COAGULATE

SHAPED RUBBER SPONGE

INVENTOR.
STEWART R. OGILBY
BY Gourley & Budlong
ATTORNEYS

Patented Aug. 9, 1938

2,126,273

UNITED STATES PATENT OFFICE 2,126,273

METHOD OF MAKING SPONGE RUBBER

Stewart R. Ogilby, Staten Island, N. Y., assignor to United States Rubber Products, Inc., New York, N. Y., a corporation of Delaware Application August 13, 1936, Serial No. 95,843

5 Claims. (Cl. 18—53)

This invention relates to methods of making sponge rubber, and more particularly to methods of making sponge rubber from latex.

Prior processes involving the charging of latex with carbon dioxide under pressure have necessitated simultaneous inflation and coagulation, or even coagulation prior to inflation, or have required maintenance of a high pressure of carbon dioxide during vulcanization.

According to the present invention, a gas, such as carbon dioxide, is dissolved under pressure in a latex composition which is stabilized against coagulation by the gas and the pressure is thereafter reduced to a substantially lower pressure, conveniently to atmospheric pressure, whereupon the latex expands or "blows" to form a substantially uncoagulated latex foam because of the liberation of gas bubbles in the latex by virtue of the reduced solubility of the gas at the lower pressure. The foam is then converted into the desired shape by pouring into molds, dipping, spreading on a suitable base or otherwise shaping, and thereafter the latex in the foam is coagulated to form rubber sponge. The sponge may then be dried and vulcanized. To provide for ultimate coagulation of the foamed latex after it is molded, the latex composition includes a suitable delayed-action coagulant or gelling agent which will function upon allowing the shaped foam to stand or upon heating the foam, or the latex is otherwise made heat-sensitive in known manner. The inflating gas may itself tend to make the latex heat-sensitive, as in the case of carbon dioxide. In such case, the latex composition should be protected against immediate coagulation by the solute gas at the working temperatures by the inclusion therein of a suitable amount of a stabilizer which becomes ineffective upon allowing the latex to stand for a time or upon heating it.

The following example illustrates the process of the present invention, the latex being compounded so that it is stable against coagulation by carbonic acid at room temperature and at pressures up to at least 100 pounds per square inch, but is heat sensitized so that at elevated temperatures it will coagulate.

Latex compound

| | Parts by weight |
|---|---|
| Latex (once creamed) { Solids | 100 |
|                       NH$_3$ | .77 |
|                       Water | 50 |
| 10% Saponin aq. sol'n | 10 |
| Formaldehyde (37.7% aq. sol'n) to reduce NH$_3$ content to 0.1% | 4.85 |
| 10% Saponin aq. sol'n | 5 |
| Water | 15 |
| 61.6% Sulphur aq. suspension | 3.25 |
| Spindle oil | 10 |
| Oleic acid | .5 |
| 20% KOH aq. sol'n | .5 |
| Water | 10 |
| Zinc dimethyldithiocarbamate | 1 |
| Potassium caseinate | .1 |
| Water | 1.25 |
| Zinc oxide | 2.5 |
| Glue | .1 |
| Water | 3.75 |
| 10% Ammonium caseinate aq. sol'n | 20 |
| Calcium sulphate | .50 |
| Water | 4.26 |

The solids content of the above latex compound was about 45%.

The compounding ingredients were added to the latex in the above order. The saponin acts as a stabilizer against chemical coagulation by the carbon dioxide charging gas and the formaldehyde which reacts with the ammonia in the latex before charging with the carbon dioxide. The sulphur and zinc oxide are vulcanizing ingredients, the sulphur being added as a suspension in water and the zinc oxide as a paste with glue as a protective agent. The zinc dimethyl dithiocarbamate is a low temperature accelerator added in the form of a paste with potassium caseinate as a dispersing and protective agent. This accelerator permits rapid curing at 212° F. The spindle oil gives desirable properties to the rubber product and the soap (oleic acid and KOH in the above formula) is used as an emulsifying agent for the spindle oil. The calcium sulphate is added to heat sensitize the latex so that there will be a complete coagulation during the heating of the foam to produce the sponge rubber product, the ammonium caseinate acting as a dispersing and protective agent for the calcium sulphate.

The above latex composition was placed in an enclosed container equipped with a stirrer and carbon dioxide was admitted at about 60 pounds' gauge pressure. The pressure was maintained and the stirring continued for 2½ hours, after which time sufficient carbon dioxide had been dissolved so that on reduction of the pressure, a foam of the desired density would be obtained. The pH of the latex at this point was about 6.9. Then, while maintaining the gas pressure above the latex and thereby keeping the latex in the container uninflated, the latex was drawn from the container through a suitable valve open to the atmosphere whereby the effluent latex expanded to form a substantially uncoagulated foam permeated with minute bubbles of $CO_2$ gas liberated from solution because of the decreased pressure. The foam was poured into molds and vulcanized in steam at 3 pounds' (gauge) pressure for one hour. The above latex compound is considerably thickened upon dissolution therein of the carbon dioxide, but the latex foam is considered substantially uncoagulated so long as it can be poured into molds or otherwise shaped before being coagulated in the final form. If desired, the latex may be permitted to expand to a foam in the charging vessel by releasing the gas pressure above the latex, provided there is room for expansion of the latex in the vessel, and the resultant foam may thereafter be poured from the vessel.

For the purpose of economy in carbon dioxide and time employed, it is advantageous to reduce the alkalinity of the latex by removal of ammonia to a low value, such as to a pH of 7.5 to 9.5, prior to charging the latex with carbon dioxide.

The charging of the latex with $CO_2$ has been carried out at various $CO_2$ pressures ranging from 25 to 100 lbs. per sq. inch. For practical purposes the pressure need not exceed 65 lbs., pressures of 40 to 50 lbs. being entirely satisfactory. The rapidity with which the $CO_2$ is dissolved has been found to depend more on the effectiveness of the stirring means than on the pressure of the gas. With a fairly rapid churning (240 R. P. M.) substantial equilibrium has been reached in ½ hour using a $CO_2$ pressure of only 40 lbs.

The pH of the latex charged with $CO_2$ is found to be within the range from 6.8 to 7.2, being usually about 6.9.

The drawing shows the essential steps of the applicant's process; namely, charging with carbon dioxide under pressure (step illustrated at top arrow) a "Latex stabilized against coagulation by carbon dioxide" to form an "Uncoagulated latex under pressure containing dissolved carbon dioxide", releasing the pressure and pouring into molds (step illustrated at middle arrow) to give a "Shaped uncoagulated latex foam" which is coagulated (step illustrated at bottom arrow) to form the "Shaped rubber sponge" final product.

Other gases than carbon dioxide, which likewise have a relatively high solubility in water, may be used, for example, nitrous oxide.

Latex which has been prevulcanized or partly vulcanized in the liquid state, may likewise be charged and then expanded to a foam that can be converted into the desired shape before coagulation of the rubber in the latex to form rubber sponge.

The term "latex" is used to designate broadly dispersions of elastic material including artificial dispersions of rubber or rubber-like materials as well as natural latex which may be preserved or compounded or otherwise treated as desired and which may be in a normal, diluted, concentrated or purified condition produced by methods well known in the art.

In view of the many changes and modifications that may be made without departing from the principles underlying the invention, reference should be made to the appended claims for an understanding of the scope of the invention.

Having thus described my invention what I claim and desire to protect by Letters Patent is:

1. The method of making sponge rubber comprising dissolving a gas selected from the group consisting of carbon dioxide and nitrous oxide under pressure in a latex composition which is stabilized against coagulation by said gas at atmospheric and elevated pressure, releasing the pressure on the latex thereby forming a substantially uncoagulated latex foam, converting the foam into the desired shape, and coagulating the latex in the foam to form rubber sponge.

2. The method of making sponge rubber comprising dissolving carbon dioxide under pressure in a latex composition in a vessel, said latex composition being stabilized against coagulation by carbon dioxide at atmospheric and elevated pressures, expelling the latex from said vessel into another vessel at a lower pressure thereby forming a substantially uncoagulated latex foam, converting the foam into the desired shape and coagulating the latex in the foam to form rubber sponge.

3. The method of making sponge rubber comprising dissolving carbon dioxide under pressure in a latex composition which is stabilized against coagulation by carbon dioxide at atmospheric and elevated pressures, releasing the pressure thereby forming a substantially uncoagulated latex foam, converting the foam into the desired shape and coagulating the latex in the foam to form rubber sponge.

4. The method of making sponge rubber comprising dissolving carbon dioxide at room temperature under pressure in a latex composition which is stabilized against coagulation by carbon dioxide at room temperature at atmospheric and elevated pressures but which will coagulate at elevated temperatures, releasing the pressure thereby forming a substantially uncoagulated latex foam, converting the foam into the desired shape, and heating the foam to coagulate the latex therein and form rubber sponge.

5. The method of making sponge rubber comprising dissolving carbon dioxide at room temperature under pressure in a latex composition in a vessel, said latex composition being stabilized against coagulation by carbon dioxide at room temperature at atmospheric and elevated pressures but being coagulable at elevated temperatures, expelling the latex from said vessel into another vessel at a lower pressure thereby forming a substantially uncoagulated latex foam, converting the foam into the desired shape, and heating the foam to coagulate the latex therein and form rubber sponge.

STEWART R. OGILBY.